Sept. 18, 1956 E. M. RICHARDSON Re. 24,220

REINFORCED FIBERBOARD BOX

Original Filed July 17, 1950

INVENTOR.

E. M. Richardson

BY

Gary, Desmond & Parker

ATTORNEYS

United States Patent Office

Re. 24,220
Reissued Sept. 18, 1956

24,220

REINFORCED FIBERBOARD BOX

Edward M. Richardson, Indianapolis, Ind., assignor, by direct and mesne assignments, to Boxcraft Corporation, Chicago, Ill., a corporation of Illinois Original No. 2,711,280, dated June 21, 1955, Serial No. 174,205, July 17, 1950. Application for reissue January 18, 1956, Serial No. 560,054

3 Claims. (Cl. 220—23)

Matter enclosed in heavy brackets [ ] appears in the original patent but forms no part of this reissue specification; matter printed in italics indicates the additions made by reissue.

This invention relates to reinforced boxes and is more particularly concerned with the provision of a box formed from sheet material such as solid or corrugated fiberboard.

The present invention contemplates the provision of a reinforced fiberboard box construction in which the side walls of the box are reinforced by means of strips of reinforcing material stapled and/or glued thereto. When boxes of this type are not filled to capacity and are stacked one upon the other, the side and end walls of the lower boxes tend to collapse. In the present invention reinforcing members in the form of strips of wood are disposed along the side walls adjacent the top cover or flaps to resist forces tending to crush the box.

This invention further contemplates the provision of a reinforced fiberboard box in which the reinforcing members serve to strengthen the box longitudinally and also act to resist inward collapse of the end walls when a load is placed upon the top of the box.

This invention further contemplates the provision of a reinforced fiberboard box construction in which a pair of longitudinally extending reinforcing strips are mounted in spaced relation along the upper and lower edges of each side wall panel, and if desired, the reinforcing members on each side wall panel may be engaged on their adjacent edges by means of transversely extending reinforcing members secured to the side panels.

This invention further contemplates the provision of a relatively strong and inexpensive reinforced fiberboard box formed from one or more blanks of solid or corrugated fiberboard cut and scored to form a standard box, a Bliss type box, or other style of box adapted to be shipped or stored in a flat condition and assembled at the point of use.

This invention embodies other novel features, details of construction and arrangement of parts which are hereinafter set forth in the specification and claim and illustrated in the accompanying drawing, wherein:

Figure 1:
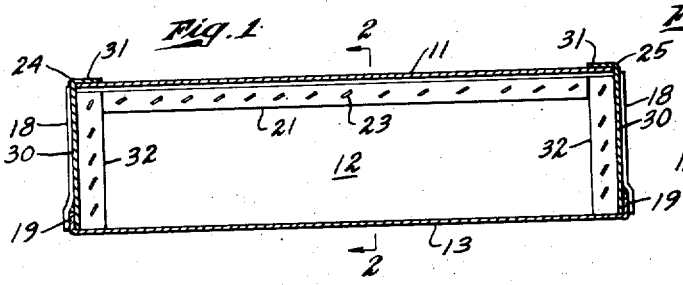
Fig. 1 is a longitudinal sectional view taken along the line 1—1 of Fig. 2 illustrating a reinforced fiberboard Bliss type box embodying features of the present invention.

Referring now to the drawing for a better understanding of the present invention, and more particularly to Figs. 1 to 4 therein, a Bliss type reinforced fiberboard box is shown as comprising a blank 6 of solid or corrugated fiberboard scored longitudinally along spaced parallel lines 7, 8, 9 and 10 to define a cover 11, a side panel 12, a bottom 13, a side panel 14 and a side flap 15. The blank 6 is also scored transversely along the lines 16 and 17 to define end flaps 18—18 on the side panel 12, end flaps 19—19 on the bottom 13, and end flaps 20—20 on the side panel 14. A reinforcing member 21 is secured to the side panel 12 adjacent and parallel to the score line 7, and a reinforcing member 22 is secured to the side panel 14 adjacent and parallel to the score line 10. The reinforcing members 21 and 22 are preferably in the form of strips of wood secured to their respective side panels by means of staples 23 and/or adhesive, but it is contemplated that the reinforcing members may, if desired, be formed of fiberboard, metal or other material.

Figure 4:
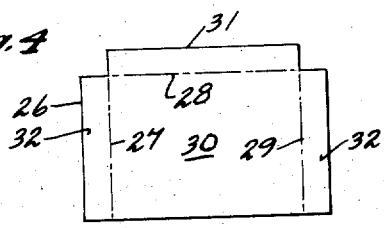
Fig. 4 is a plan view illustrating the manner in which a blank of fiberboard is cut and scored to form an end wall section of the box.

The ends of the box are closed by means of end sections 24 and 25, each of which is shown in Fig. 4 as comprising a blank 26 of solid or corrugated fiberboard scored along the lines 27, 28 and 29 to define an end panel 30, a top flap 31 and side flaps 32—32.

Figure 2:
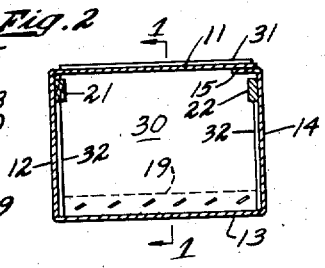
Fig. 2 is a transverse sectional view taken along the line 2—2 of Fig. 1.

As illustrated in Figs. 1 and 2 in the drawing, the box is formed from a blank 6 and two blanks 26 by securing the side flaps 32—32 of each end section 24 and 25 to the inner faces of the side panels 12 and 14 and by securing the top flaps 31—31 to the upper surface of the cover 11. The end flaps 19—19 on the bottom panel 13 are secured to the outer faces of their respective end sections 24 and 25, and the end flaps 18—18 and 20—20 provided on the side panels 12 and 14, respectively, are also secured to the outer surfaces of the end sections 24 and 25. It is contemplated that the several parts of the box may be secured together in the manner thus shown and described by employing the use of staples 23 and/or adhesive.

Figure 3:
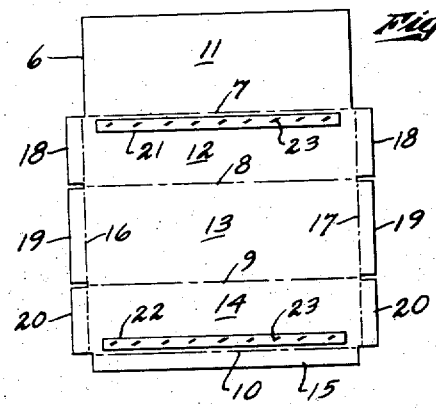
Fig. 3 is a plan view illustrating the manner in which a blank of fiberboard is cut and scored to form hingedly connected top, bottom and side wall sections of the box illustrated in Figs. 1 and 2, the reinforcing strip being secured to each side wall section.
Figure 8:
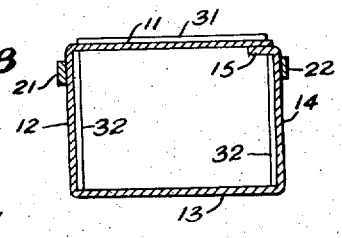
Fig. 8 is a transverse sectional view taken along the line 8—8 of Fig. 7.
Figure 7:
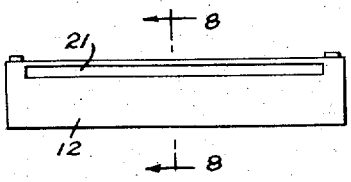
Fig. 7 is a side elevational view illustrating another modified form of the invention in which the blank with reinforcing members thereon, as illustrated in Fig. 3, is folded to dispose the reinforcing members on the outer surfaces of the side walls of the box.

After a box has been set up, filled with merchandise and sealed, it will be noted that the reinforcing members 21 and 22 are disposed on their respective side panels 12 and 14 adjacent the underside of the cover 11 and thus act to resist crushing or collapsing of the medial portion of the box when a load is placed upon the box. To further increase the strength of the box, it will also be noted that the ends of the reinforcing members may be extended into engagement with the flanges 32—32 on the end sections 24 and 25 and thus act to resist inward collapse of the end sections responsive to a load placed on the box. In reinforcing boxes of standard or other style of construction, it is contemplated that the ends of the reinforcing members may, if desired, be extended to engage against the inner faces of the end panels 30—30. If desired, the reinforcing members 21 and 22 may be secured to the outer surfaces of the side panels 12 and 14 adjacent the upper edges of the side panels as illustrated in Figs. 3, 7 and 8.

Figure 5:
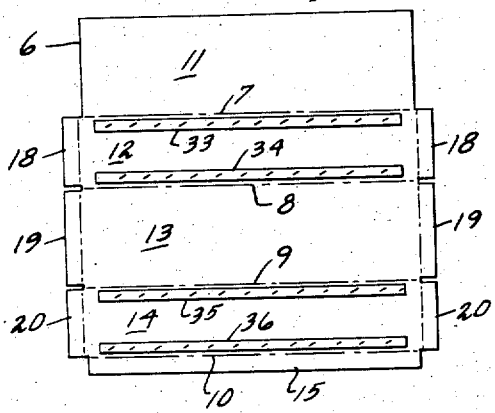
Fig. 5 is a plan view illustrating a modified form of this invention in which a pair of reinforcing members are secured to each side panel of the fiberboard blank.

Fig. 5 in the drawing illustrates a modified form of this invention in which a pair of reinforcing members 33 and 34 are secured in spaced parallel relation to the side panel 12 adjacent the score lines 7 and 8, respectively, and a pair of reinforcing members 35 and 36 are secured in spaced parallel relation to the side panel 14 adjacent the score lines 9 and 10, respectively. In this form of the invention the reinforcing members 33 and 36 serve to resist crushing or collapse of the medial portion of the top of the box, while the reinforcing members 34 and 35 act to resist collapse of the medial portion of the bottom of the box. This form of the invention is otherwise similar to the form heretofore shown and described.

Figure 6:
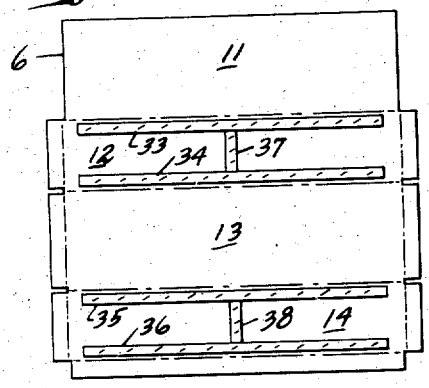
Fig. 6 is a plan view illustrating another modified form of this invention in which each side panel of the blank is provided with a pair of longitudinally extending reinforcing members engaged along their opposing side edges by one or more transversely extending reinforcing members.

Fig. 6 illustrates a further modified form of this invention in which one or more transversely disposed reinforcing members 37 are secured to the side panel 12 and extend between and into engagement with the reinforcing members 33 and 34. One or more transversely disposed reinforcing members 38 are also secured to the side panel 14 to extend between and into engagement with the reinforcing members 35 and 36. In this form of the invention the transverse reinforcing members 37 and 38 coact with the side panels 12 and 14 and the end sections 24 and 25 to resist collapse of the box responsive to a load placed thereon. This form of the invention is otherwise similar to the forms heretofore shown and described.

While this invention has been shown in several forms, it is obvious to those skilled in the art that it is not so limited but is susceptible of various changes and modifications without departing from the spirit and scope of the claimed invention.

I claim as my invention:

*1.* A box structure having a body formed entirely of flexible paperboard material and including top, bottom, and side walls relatively foldable to erected condition substantially normal to each other upon longitudinal folding scores, end wall panels closing the ends of said body, the longitudinal dimension of said side walls being at least twice the width of said end wall panels, and reinforcing means consisting of elongated wooden strips fixedly secured to the opposite side walls in pairs, one strip of each pair being parallel to but spaced slightly inwardly of the folding score between the top and side wall and the other strip of each pair being parallel to but spaced slightly inwardly of the folding score between the side wall and the bottom, each of said strips being of a length substantially less than said side wall and terminating inwardly of the ends thereof and spaced from said end walls a distance at least equal to the width of the strip, whereby compressive stresses applied laterally of the box will be initially absorbed by the paperboard material at said longitudinal folding scores and will not dislodge said reinforcing means, and compressive stresses exerted longitudinally of the box and tending to collapse an end wall panel toward an adjacent end of said reinforcing means will not dislodge said reinforcing means.

*2. An elongated rectangular box having a body formed entirely of flexible paper board material and including top, bottom, side and end walls, the top, bottom and side walls being relatively foldable to erected condition substantially normal to each other upon longitudinal folding scores, end wall panels closing the ends of said body, the longitudinal dimension of said side, top, and bottom walls being substantially greater than the transverse dimension of the box, and reinforcing means consisting of elongated wooden strips fixedly secured to the opposite side walls in pairs, one strip of each pair being parallel to but spaced slightly inwardly of the folding score between the top and side walls and the other strip of each pair being parallel to but slightly spaced inwardly of the folding score between the side wall and the bottom wall, each of said strips being of a length less than said side wall and terminating a substantial predetermined distance from said end walls, whereby compressive stresses applied laterally of the box will be initially absorbed by the paperboard material at said longitudinal folding scores and will not dislodge said reinforcing means, and compressive stresses exerted longitudinally of the box and tending to collapse an end wall panel toward an adjacent end of said reinforcing means will not dislodge said reinforcing means.*

*3. An elongated rectangular box having a body formed entirely of flexible paperboard material and including top, bottom, side and end walls, at least the bottom and side walls being relatively foldable to erected condition substantially normal to each other upon longitudinal folding scores, wall panels closing the top and ends of said box body, the longitudinal dimension of said side, top and bottom walls being substantially greater than the transverse dimension of the box, and reinforcing means consisting of elongated wooden strips fixedly secured to the opposite side walls in pairs, one strip of each pair being parallel to but spaced slightly inwardly from the lower face of the top wall panel and the other strip of each pair being parallel to but slightly spaced inwardly of the folding score between the side wall and the bottom wall, each of said strips being of a length less than said side wall and terminating a substantial predetermined distance from said end walls, whereby compressive stresses applied laterally of the box will be initially absorbed by the paperboard material at said longitudinal folding scores and will not dislodge said reinforcing means, and compressive stresses exerted longitudinally of the box and tending to collapse an end wall panel toward an adjacent end of said reinforcing means will not dislodge said reinforcing means.*

References Cited in the file of this patent or the original patent

UNITED STATES PATENTS

| | | |
|---|---|---|
| 972,586 | Wahl | Oct. 11, 1910 |
| 1,524,292 | Dinsmoor | Jan. 27, 1925 |
| 2,054,764 | Berkawitz | Sept. 15, 1936 |
| 2,071,962 | Babcock | Feb. 23, 1937 |
| 2,175,476 | Martin | Oct. 10, 1939 |
| 2,262,267 | Boeye | Nov. 11, 1941 |
| 2,281,061 | Boeye | Apr. 28, 1942 |
| 2,319,641 | Speir | May 18, 1943 |
| 2,443,713 | Anderson | June 22, 1948 |
| 2,488,692 | Talbot | Nov. 22, 1949 |

FOREIGN PATENTS

| | | |
|---|---|---|
| 471,296 | Germany | Feb. 11, 1929 |
| 539,612 | Great Britain | Sept. 17, 1941 |
| 584,503 | Great Britain | Jan. 16, 1947 |